United States Patent
Takahashi

(10) Patent No.: US 12,509,041 B2
(45) Date of Patent: Dec. 30, 2025

(54) VEHICLE BRAKING DEVICE

(71) Applicant: ADVICS CO., LTD., Kariya (JP)

(72) Inventor: Atsushi Takahashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 410 days.

(21) Appl. No.: 18/006,634

(22) PCT Filed: Jul. 29, 2021

(86) PCT No.: PCT/JP2021/028097
§ 371 (c)(1),
(2) Date: Jan. 24, 2023

(87) PCT Pub. No.: WO2022/025182
PCT Pub. Date: Feb. 3, 2022

(65) Prior Publication Data
US 2023/0286479 A1 Sep. 14, 2023

(30) Foreign Application Priority Data
Jul. 31, 2020 (JP) .................. 2020-130835

(51) Int. Cl.
*B60T 13/16* (2006.01)
*B60T 13/14* (2006.01)
*B60T 13/68* (2006.01)

(52) U.S. Cl.
CPC .......... *B60T 13/147* (2013.01); *B60T 13/148* (2013.01); *B60T 13/686* (2013.01)

(58) Field of Classification Search
CPC ..... B60T 13/147; B60T 13/148; B60T 13/686
(Continued)

(56) References Cited

U.S. PATENT DOCUMENTS 10,391,994 B2 * 8/2019 Drumm ................. B60T 13/142
11,148,651 B2 * 10/2021 Hienz ....................... B60T 7/12
(Continued)

FOREIGN PATENT DOCUMENTS

JP 6394562 B2 9/2018

OTHER PUBLICATIONS

International Search Report (PCT/ISA/210) with English Translation and Written Opinion (PCT/ISA/237) mailed on Oct. 12, 2021, by the Japanese Patent Office as the International Searching Authority for International Application No. PCT/JP2021/028097 (5 pages).

*Primary Examiner* — Christopher P Schwartz
(74) *Attorney, Agent, or Firm* — BUCHANAN INGERSOLL & ROONEY PC

(57) ABSTRACT

A vehicle braking device includes: a first hydraulic pressure generation unit that is connected to a first wheel cylinder via a first fluid passage, and generates a hydraulic pressure in the first wheel cylinder; a second hydraulic pressure generation unit that is connected to a second wheel cylinder via a second fluid passage, and generates a hydraulic pressure in the second wheel cylinder; a first power supply unit that supplies electric power to the first hydraulic pressure generation unit; a second power supply unit that supplies electric power to the second hydraulic pressure generation unit; and a normally open communication passage opening and closing unit that is provided in a communication passage connecting the first fluid passage and the second fluid passage, and opens and closes the communication passage.

10 Claims, 5 Drawing Sheets

(58) Field of Classification Search
USPC .............. 303/3, 10, 11, 15, 20, 113.1–113.4,
303/115.2, 115.4, 116.1, 116.2
See application file for complete search history.

(56) References Cited

U.S. PATENT DOCUMENTS

| | | | |
|---|---|---|---|
| 11,584,346 B2* | 2/2023 | Strengert | B60T 13/686 |
| 11,981,304 B2* | 5/2024 | Friedrich | B60T 13/686 |
| 12,269,444 B2* | 4/2025 | Digesu' | B60T 13/686 |
| 2017/0072920 A1* | 3/2017 | Besier | B60T 8/4081 |
| 2018/0273007 A1 | 9/2018 | Ishikawa et al. | |
| 2018/0290640 A1* | 10/2018 | Johnson | B60T 13/662 |

* cited by examiner

VEHICLE BRAKING DEVICE

TECHNICAL FIELD

The present disclosure relates to a vehicle braking device.

BACKGROUND ART

A vehicle braking device is configured to supply a hydraulic pressure to a plurality of wheel cylinders. For example, a braking device described in JP6394562B includes a wheel cylinder in a first system, which is connected to a first hydraulic unit, a wheel cylinder in a second system, which is connected to a second hydraulic unit, a normally closed electromagnetic valve provided in a communication passage connecting the first hydraulic unit and the second hydraulic unit, and an ECU that executes various controls.

CITATION LIST

Patent Literature

PTL 1: JP6394562B

SUMMARY

Technical Problem

With the development in autonomous vehicles, the importance of a system having redundancy in braking force is further increasing. Therefore, the present inventors have developed a new system that can independently control hydraulic pressures in a plurality of wheel cylinders in a normal state and can generate the hydraulic pressures in the plurality of wheel cylinders even in a case where one power supply unit fails.

An object of the present disclosure is to provide a new vehicle braking device that can independently control hydraulic pressures in a plurality of wheel cylinders and generate hydraulic pressures in the plurality of wheel cylinders even in a case where one power supply unit fails.

Solution to Problem

A vehicle braking device according to the present disclosure includes: a first hydraulic pressure generation unit that is connected to a first wheel cylinder via a first fluid passage and generates a hydraulic pressure in the first wheel cylinder; a second hydraulic pressure generation unit that is connected to a second wheel cylinder via a second fluid passage and generates a hydraulic pressure in the second wheel cylinder; a first power supply unit that supplies electric power to the first hydraulic pressure generation unit; a second power supply unit that supplies electric power to the second hydraulic pressure generation unit; and a normally open communication passage opening and closing unit that is provided in a communication passage connecting the first fluid passage and the second fluid passage, opens and closes the communication passage, and is opened in a state where electric power is not supplied.

Advantageous Effects

According to the present disclosure, the first fluid passage and the second fluid passage are separated from each other in terms of hydraulic pressure by closing the communication passage opening and closing unit, and fluid pressures in the wheel cylinders can be independently controlled. In addition, since the communication passage opening and closing unit is normally open, the communication passage opening and closing unit can be brought into an open state regardless of the presence or absence of a failure in the power supply unit even in a case where one of the first power supply unit and the second power supply unit fails. In a state where the first fluid passage and the second fluid passage communicate with each other through the communication passage, a normal power supply unit (the other of the first power supply unit and the second power supply unit) drives the corresponding hydraulic pressure generation unit. Accordingly, the hydraulic pressure can be generated in both the first wheel cylinder and the second wheel cylinder by one of the hydraulic pressure generation units. According to the present disclosure, the hydraulic pressures in the plurality of wheel cylinders can be independently controlled, and even in a case where one power supply unit fails, the hydraulic pressures can be generated in the plurality of wheel cylinders.

DESCRIPTION OF EMBODIMENTS

Figure 1:
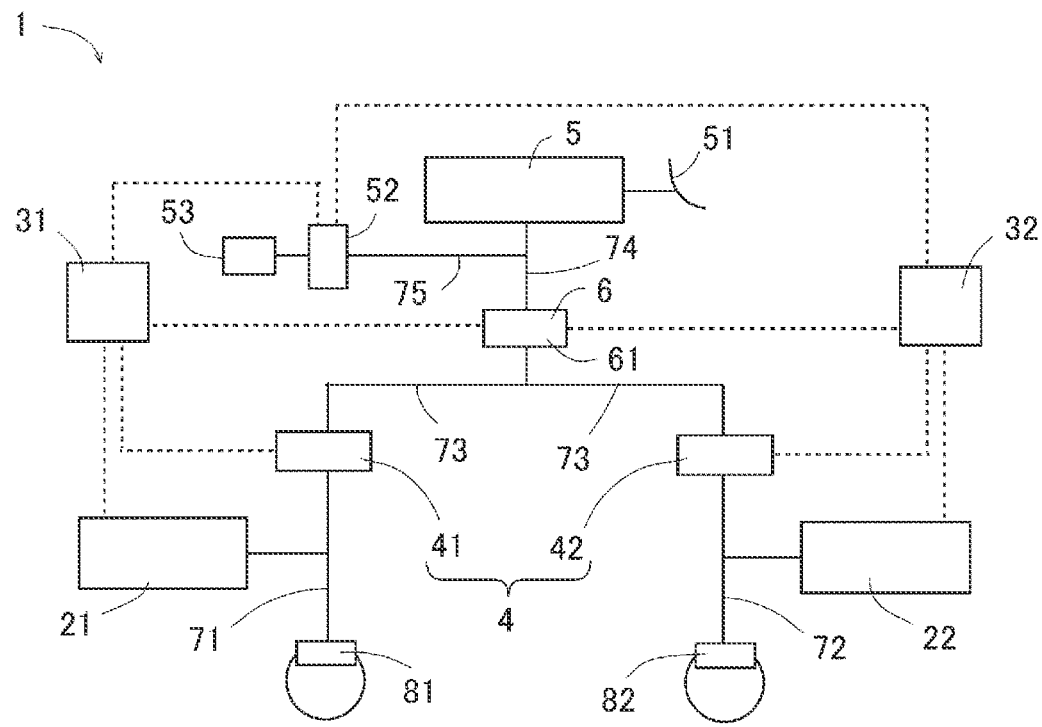
FIG. 1 is a configuration diagram of a vehicle braking device according to the present embodiment.

Hereinafter, an embodiment of the vehicle brake device will be described with reference to the drawings. In the following embodiment and modifications, the same or equivalent parts are denoted by the same reference numerals in the drawings. Further, each drawing used in the description is a conceptual diagram.

In the example of the present embodiment, a vehicle braking device 1 applies a braking force to two front wheels, and another braking device, for example, an electronic mechanical brake (EMB) or another vehicle braking device 1 that is independent of the front wheels, applies a braking force to two rear wheels. In the vehicle braking device 1 according to the present embodiment, for example, a first wheel cylinder 81 corresponds to a right front wheel, and a second wheel cylinder 82 corresponds to a left front wheel.

As shown in FIG. 1, the vehicle braking device 1 according to the present embodiment includes a first hydraulic pressure generation unit 21, a second hydraulic pressure generation unit 22, a first power supply unit 31, a second power supply unit 32, a communication passage opening and closing unit 4, a master cylinder 5, and a master fluid passage opening and closing unit 6.

The first hydraulic pressure generation unit 21 is a device that is connected to the first wheel cylinder 81 via a first fluid passage 71 and generates a hydraulic pressure in the first wheel cylinder 81. The first hydraulic pressure generation unit 21 according to the present embodiment is an electric cylinder, and includes a motor, a linear motion conversion member, a cylinder, and a piston, which are not shown. A brake fluid in the cylinder flows out to the first fluid passage 71 by a movement of the piston in one direction, and the brake fluid flows into the cylinder from the first fluid passage 71 by a movement of the piston in the other direction. The first hydraulic pressure generation unit 21 may also be called a pressure regulating device that regulates the hydraulic pressure in the first wheel cylinder 81 by the movement of the piston.

The second hydraulic pressure generation unit 22 is a device that is connected to the second wheel cylinder 82 via a second fluid passage 72 and generates a hydraulic pressure in the second wheel cylinder 82. The second hydraulic pressure generation unit 22 is a separate device independent of the first hydraulic pressure generation unit 21. Similar to the first hydraulic pressure generation unit 21, the second hydraulic pressure generation unit 22 according to the present embodiment is an electric cylinder, and includes a motor, a linear motion conversion member, a cylinder, and a piston, which are not shown. The second hydraulic pressure generation unit 22 may also be called a pressure regulating device that regulates the hydraulic pressure in the second wheel cylinder 82 by the movement of the piston.

The first power supply unit 31 is a device that supplies electric power to the first hydraulic pressure generation unit 21. The first power supply unit 31 according to the present embodiment includes a first power supply (for example, a first battery) and a first electronic control unit (ECU), which are not shown. The first power supply unit 31 controls the first hydraulic pressure generation unit 21.

The second power supply unit 32 is a device that supplies electric power to the second hydraulic pressure generation unit 22. The second power supply unit 32 according to the present embodiment is a device separate from the first power supply unit 31, and includes a second power supply (for example, a second battery) and a second ECU, which are not shown. The second power supply unit 32 is configured to supply power to a power supply target independently of the first power supply unit 31. The second power supply unit 32 controls the second hydraulic pressure generation unit 22.

The communication passage opening and closing unit 4 is a normally open valve device that is provided in a communication passage 73 connecting the first fluid passage 71 and the second fluid passage 72, and opens and closes the communication passage 73. In the present disclosure, the term "normally open" means a configuration that opens (communicates) in a state where electric power is not supplied. The communication passage opening and closing unit 4 includes a first communication electromagnetic valve 41 that is a normally open electromagnetic valve, and a second communication electromagnetic valve 42 that is a normally open electromagnetic valve disposed in series with the first communication electromagnetic valve 41.

The master cylinder 5 is a member that is connected to the communication passage 73 via a master fluid passage 74 and generates a hydraulic pressure corresponding to an operation amount of a brake pedal 51. The master cylinder 5 according to the present embodiment is a single type master cylinder including a cylinder, a piston, a reservoir, and the like, which are not shown. The master cylinder 5 is configured such that the piston causes a brake fluid in the cylinder to flow out to the master fluid passage 74 in accordance with the operation amount of the brake pedal 51. The operation amount of the brake pedal 51 is detected by, for example, a stroke sensor or a pressure sensor, which is not shown.

The master fluid passage 74 connects the master cylinder 5 and a part of the communication passage 73 between the first communication electromagnetic valve 41 and the second communication electromagnetic valve 42. Therefore, the master cylinder 5 and the first wheel cylinder 81 are connected to each other via the master fluid passage opening and closing unit 6 and the first communication electromagnetic valve 41. The master cylinder 5 and the second wheel cylinder 82 are connected to each other via the master fluid passage opening and closing unit 6 and the second communication electromagnetic valve 42.

In the present embodiment, the first communication electromagnetic valve 41 is an electromagnetic valve that includes a valve body disposed on a first wheel cylinder 81 side, and a valve seat disposed on a master cylinder 5 side. That is, in a valve closed state, the valve body of the first communication electromagnetic valve 41 receives a force in a closing direction by self-sealing in a case where a hydraulic pressure in the first wheel cylinder 81 is higher than a hydraulic pressure on the master cylinder 5 side. With the same arrangement, in the valve closed state, a valve body of the second communication electromagnetic valve 42 also receives a force in a closing direction by self-sealing in a case where a hydraulic pressure in the second wheel cylinder 82 is higher than a hydraulic pressure on the master cylinder 5 side. A flow passage cross-sectional area (a size of the valve body) of each of the first communication electromagnetic valve 41 and the second communication electromagnetic valve 42 is larger than a flow passage cross-sectional area of a master electromagnetic valve 61 to be described later.

The master fluid passage opening and closing unit 6 is a normally open valve device that is provided in the master fluid passage 74 and opens and closes the master fluid passage 74. The master fluid passage opening and closing unit 6 according to the present embodiment is implemented by the master electromagnetic valve 61 that is a normally open electromagnetic valve. The master electromagnetic valve 61 is driven by the first power supply unit 31 and the second power supply unit 32. That is, the master electromagnetic valve 61 is configured to be supplied with power from both the first power supply unit 31 and the second power supply unit 32. For example, a double winding coil is employed as a coil in the master electromagnetic valve 61.

The master electromagnetic valve 61 is closed by being supplied with power from at least one of the first power supply unit 31 and the second power supply unit 32. For example, when the master electromagnetic valve 61 is to be closed, in a case where both the power supply units 31 and 32 are normal, power is supplied from both the power supply units 31 and 32 so that the master electromagnetic valve 61 can be closed, and in a case where one of the power supply units fails, power is supplied from the other of the power supply units so that the master electromagnetic valve 61 can be closed.

In the present embodiment, the master electromagnetic valve 61 is an electromagnetic valve including a valve body disposed on a communication passage 73 side and a valve seat disposed on the master cylinder 5 side. Therefore, in the valve closed state, the valve body of the master electromagnetic valve 61 receives a force in a closing direction by self-sealing in a case where a hydraulic pressure on the communication passage 73 side is higher than a hydraulic pressure on the master cylinder 5 side.

The master electromagnetic valve 61, the first communication electromagnetic valve 41, and the second communication electromagnetic valve 42 are designed such that, in the valve closed state, shut-off between the master cylinder 5 and the wheel cylinders 81 and 82 is maintained even in a case where the hydraulic pressure in the master cylinder 5 is higher than the hydraulic pressure in each of the wheel cylinders 81 and 82 by a specified value by the brake operation.

A stroke simulator 53 is connected to a part of the master fluid passage 74 between the master cylinder 5 and the master electromagnetic valve 61 via a fluid passage 75 and a simulator cut valve 52. The simulator cut valve 52 is a normally closed electromagnetic valve that is closed in a state where electric power is not supplied. In the present disclosure, the term "normally closed" means a configuration that is closed (shut off) in a state where electric power is not supplied. The stroke simulator 53 is a device that applies a force by a hydraulic pressure generated by the operation of the brake pedal 51. Similar to the master electromagnetic valve 61, the simulator cut valve 52 is configured to be supplied with power from both the first power supply unit 31 and the second power supply unit 32.

(Normal State)

An example of an operation of the vehicle braking device 1 in a normal state will be described. When a power supply of the vehicle is turned on (when the ignition is turned on), the simulator cut valve 52 is opened by the first power supply unit 31 and the second power supply unit 32, and the master cylinder 5 and the stroke simulator 53 communicate with each other. The master electromagnetic valve 61 is closed by the first power supply unit 31 and the second power supply unit 32, the first communication electromagnetic valve 41 is closed by the first power supply unit 31, and the second communication electromagnetic valve 42 is closed by the second power supply unit 32.

In a case where the brake pedal 51 is operated or in a case where there is a separate braking request, the first power supply unit 31 drives the first hydraulic pressure generation unit 21 and the second power supply unit 32 drives the second hydraulic pressure generation unit 22 in accordance with a target braking force (target wheel pressure). The brake fluid is supplied to the first wheel cylinder 81 via the first fluid passage 71 by the drive of the first hydraulic pressure generation unit 21, and the brake fluid is supplied to the second wheel cylinder 82 via the second fluid passage 72 by the drive of the second hydraulic pressure generation unit 22. In this way, the hydraulic pressures in the wheel cylinders 81 and 82 are controlled.

(A Case where One of Power Supply Units Fails)

Next, a control example in a case where one (the first power supply unit 31 in this example) of the first power supply unit 31 and the second power supply unit 32 fails will be described. In a case where the first power supply unit 31 fails, power cannot be supplied from the first power supply unit 31. Therefore, the first communication electromagnetic valve 41 is brought into a non-energized state and is opened. In addition, the first hydraulic pressure generation unit 21 cannot be driven. The master electromagnetic valve 61 and the simulator cut valve 52 are driven by being supplied with power only by the second power supply unit 32.

For example, in a case where a failure in the first power supply unit 31 is detected, the second power supply unit 32 increases a current supplied from the second power supply unit 32 to the master electromagnetic valve 61 and maintains the master electromagnetic valve 61 in a closed state. Similarly, the second power supply unit 32 increases a current supplied from the second power supply unit 32 to the simulator cut valve 52 and maintains the simulator cut valve 52 in an open state. In addition, the second power supply unit 32 stops power supply to the second communication electromagnetic valve 42 to open the second communication electromagnetic valve 42.

In this state, in a case where the brake pedal 51 is operated or in a case where there is a separate braking request, the normal second power supply unit 32 drives the second hydraulic pressure generation unit 22, in accordance with the target braking force, to supply a brake fluid to the second fluid passage 72. The brake fluid supplied to the second fluid passage 72 is supplied to the second wheel cylinder 82 and is also supplied to the first wheel cylinder 81 via the communication passage 73.

At this time, since the master electromagnetic valve 61 is closed, the brake fluid is not supplied to the master cylinder 5. In this way, the hydraulic pressures in both the first wheel cylinder 81 and the second wheel cylinder 82 can be increased by driving the second hydraulic pressure generation unit 22. The failure in the first power supply unit 31 can be detected by, for example, detecting an output voltage or an output current of the first power supply unit 31. In addition, even if the failure occurs in the second power supply unit 32, the same operation is performed only by switching the first power supply unit 31 and the second power supply unit.

Operation and Effect of the Present Embodiment

According to the present embodiment, the first fluid passage 71 and the second fluid passage 72 are separated from each other in terms of hydraulic pressure by closing the communication passage opening and closing unit 4, and the hydraulic pressures in the wheel cylinders 81 and 82 can be independently controlled. In addition, since the communication passage opening and closing unit 4 is normally open, the communication passage opening and closing unit 4 can be brought into the open state regardless of the presence or absence of the failure in the power supply unit even in a case where one of the first power supply unit 31 and the second power supply unit 32 fails. In a state where the first fluid passage 71 and the second fluid passage 72 communicate with each other through the communication passage 73, a normal power supply unit (the other of the first power supply unit 31 and the second power supply unit 32) drives the corresponding hydraulic pressure generation unit. Accordingly, hydraulic pressures can be generated in both the first wheel cylinder 81 and the second wheel cylinder 82 by one of the hydraulic pressure generation units.

(Common Effect)

According to the present embodiment, the hydraulic pressures in the plurality of wheel cylinders 81 and 82 can be independently controlled, and even when one power supply unit fails, the hydraulic pressures can be generated in the plurality of wheel cylinders 81 and 82.

(Effects Generated by Series Arrangement of Master Fluid Passage Opening and Closing Unit and Communication Passage Opening and Closing Unit)

As described above, as the control example in the normal state, the first power supply unit 31 and the second power supply unit 32 drive the first hydraulic pressure generation unit 21 and the second hydraulic pressure generation unit 22 in a state where the master electromagnetic valve 61, the first communication electromagnetic valve 41, and the second communication electromagnetic valve 42 are closed. Accordingly, at least two electromagnetic valves are normally interposed between the master cylinder 5 and each of the wheel cylinders 81 and 82 in a closed state. Therefore, as a configuration for maintaining the shut-off between the master cylinder 5 and the wheel cylinders 81 and 82, it is sufficient to perform the hydraulic shut-off by the two electromagnetic valves. In other words, when the brake pedal 51 is operated and the hydraulic pressure in the master cylinder 5 is higher than the hydraulic pressure in each of the wheel cylinders 81 and 82, the maximum withstanding pressure design of the electromagnetic valve required to maintain the valve closing can be distributed with the two electromagnetic valves.

When a differential pressure between two ports (inlet and outlet ports) of the electromagnetic valve is referred to as an inter-port differential pressure, a maximum inter-port differential pressure (hereinafter, referred to as a maximum withstanding pressure), by which a closed state can be maintained when the pressure on the valve seat side is relatively high, is set for the electromagnetic valve. The two electromagnetic valves are disposed in series, so that the maximum withstanding pressure of each electromagnetic valve can be set to be smaller than that in the case where one electromagnetic valve is disposed. Accordingly, the size of the electromagnetic valve can be reduced.

Further, according to the present configuration, the flow passages in the first communication electromagnetic valve 41 and the second communication electromagnetic valve 42 can be enlarged. In general, when the flow passage cross-sectional area of the electromagnetic valve is increased, the valve body is increased in size, and a larger size and electric power are required to set the same maximum withstanding pressure. However, in the present configuration, the maximum withstanding pressure required for shutting off the fluid passage may be implemented by the two electromagnetic valves. Therefore, the maximum withstanding pressure of each electromagnetic valve can be reduced, or a difference can be provided in the maximum withstanding pressure between both the electromagnetic valves. Since the maximum withstanding pressure can be reduced, the flow passage in the electromagnetic valve can be enlarged.

In the present configuration, the flow passage cross-sectional area of each of the first communication electromagnetic valve 41 and the second communication electromagnetic valve 42 is larger than the flow passage cross-sectional area of the master electromagnetic valve 61. Accordingly, even when only one of the hydraulic pressure generation units is driven, a large flow passage can be ensured in the communication passage 73, so that both of the wheel cylinders 81 and 82 can be pressurized with good responsiveness.

(Effects Generated by Power Supply Configuration to Master Fluid Passage Opening and Closing Unit)

The master electromagnetic valve 61 constituting the master fluid passage opening and closing unit 6 is driven by the first power supply unit 31 and the second power supply unit 32. According to the present configuration, even if one of the power supply units fails, the master electromagnetic valve 61 can be closed by the other of the power supply units. Therefore, even in a case where one of the power supply units fails, the master cylinder 5 and the communication passage 73 can be separated from each other in terms of hydraulic pressure.

(Effects Generated by Master Cylinder)

The master cylinder 5 is connected to the communication passage 73, so that when both the first power supply unit 31 and the second power supply unit 32 fail, the brake fluid can be supplied from the master cylinder 5 to the wheel cylinders 81 and 82 based on the operation of the brake pedal 51. In this case, the master electromagnetic valve 61 is opened, the simulator cut valve 52 is closed, and the first communication electromagnetic valve 41 and the second communication electromagnetic valve 42 are opened.

<Modification 1>

Figure 2:
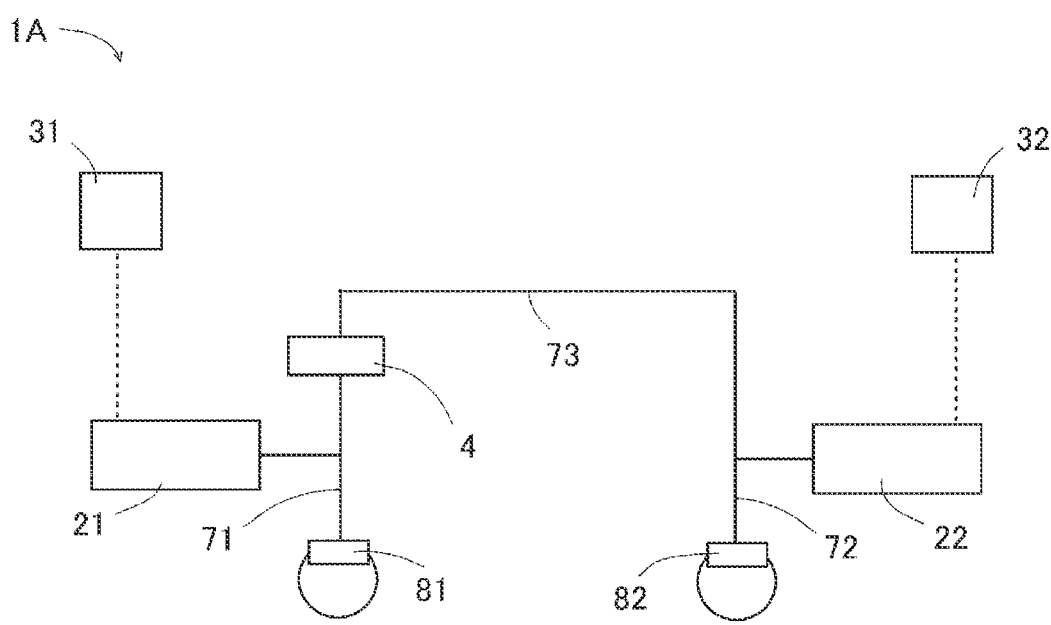
FIG. 2 is a configuration diagram of a vehicle braking device according to a first modification.

As shown in FIG. 2, a vehicle braking device 1A according to Modification 1 includes the first hydraulic pressure generation unit 21, the second hydraulic pressure generation unit 22, the first power supply unit 31, the second power supply unit 32, and the normally open communication passage opening and closing unit 4. The communication passage opening and closing unit 4 includes, for example, one or a plurality of normally open electromagnetic valves that can communicate with the communication passage 73 when not energized. According to this configuration, even if one of the power supply units fails, the communication passage opening and closing unit 4 is opened, and the hydraulic pressure generation unit is driven by the other of the power supply units. That is, in the configuration of Modification 1, the same effect as the "common effect" in the present embodiment is also exhibited.

<Modification 2>

Figure 3:
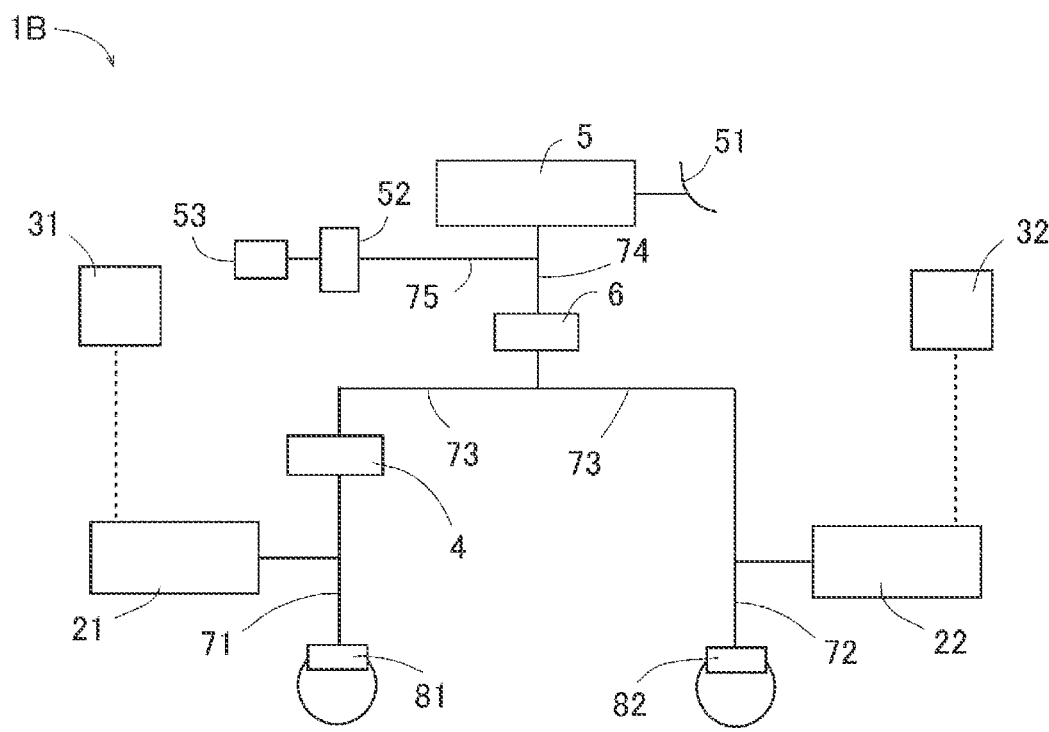
FIG. 3 is a configuration diagram of a vehicle braking device according to a second modification.

As shown in FIG. 3, a vehicle braking device 1B according to Modification 2 includes the master cylinder 5 and the normally open master fluid passage opening and closing unit 6 in addition to the configuration in FIG. 2. According to this configuration, the same effects as the "common effect" and the "effects generated by the master cylinder" in the present embodiment are exhibited. The master fluid passage opening and closing unit 6 and the communication passage opening and closing unit 4 may be driven by the first power supply unit 31, the second power supply unit 32, or another power supply unit.

In addition, in the configuration in FIG. 3, the master fluid passage opening and closing unit 6 may be configured to be supplied with power from both the first power supply unit 31 and the second power supply unit 32. In this case, for example, as in the master fluid passage opening and closing unit 6 (master electromagnetic valve 61) in FIG. 1, the master fluid passage opening and closing unit 6 in FIG. 3 is driven by the first power supply unit 31 and the second power supply unit 32. According to this configuration, the same effects as the "effects generated by the power supply configuration to the master fluid passage opening and closing unit" in the present embodiment described above are further exhibited.

<Modification 3>

Figure 4:
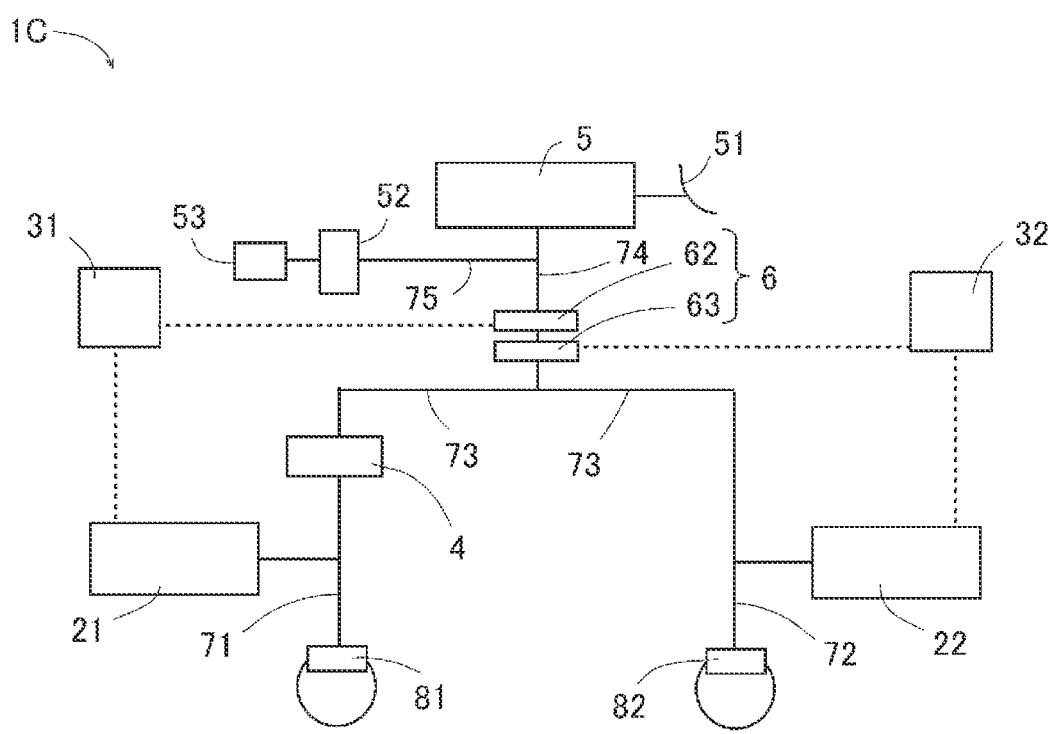
FIG. 4 is a configuration diagram of a vehicle braking device according to a third modification.

As shown in FIG. 4, in a vehicle braking device 1C according to Modification 3, the master fluid passage opening and closing unit 6 in the configuration in FIG. 3 includes two electromagnetic valves connected in series. The master fluid passage opening and closing unit 6 includes a normally open first master electromagnetic valve 62 driven by the first power supply unit 31, and a normally open second master electromagnetic valve 63 connected in series with the first master electromagnetic valve 62 and driven by the second power supply unit 32.

According to this configuration, even in a case where one of the power supply units fails, the other of the power supply units can close the corresponding master electromagnetic valve. That is, even in a case where one of the power supply units fails, the master fluid passage 74 can be shut off, and the master cylinder 5 and the wheel cylinders 81 and 82 can be separated from each other in terms of hydraulic pressure.

As the first master electromagnetic valve 62 and the second master electromagnetic valve 63, electromagnetic valves (for example, existing products) used in a current vehicle can be used, and the versatility of the system is increased. In addition, two independent electromagnetic valves are used, so that design and an arrangement change in the circuit are easy.

<Modification 4>

Figure 5:
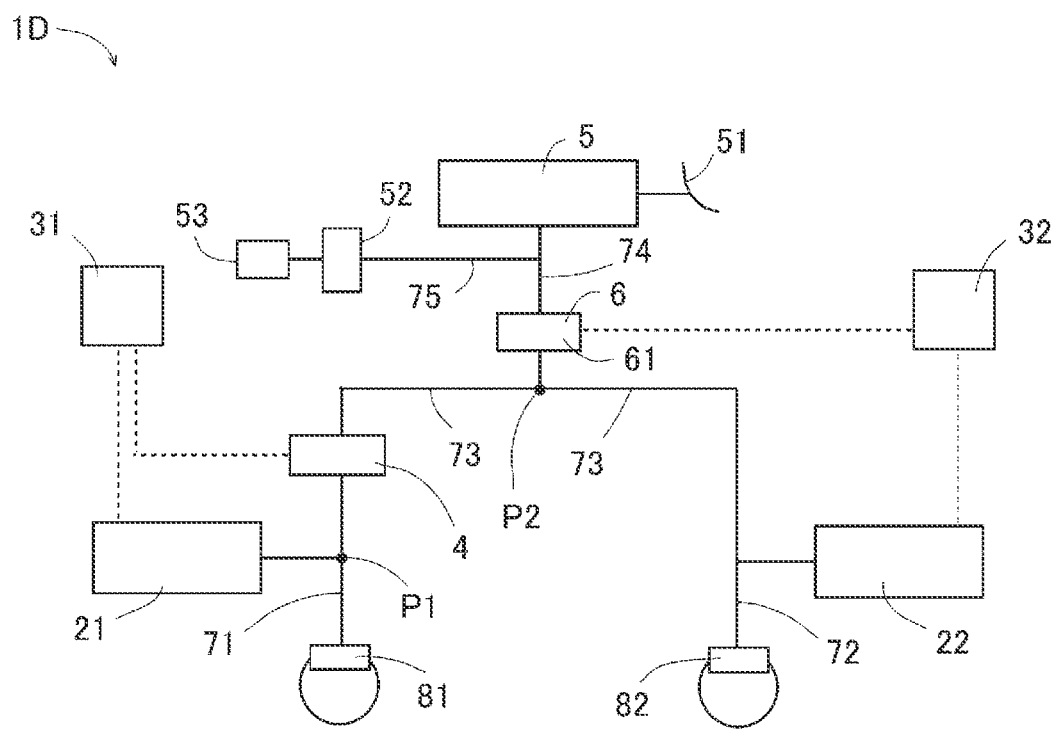
FIG. 5 is a configuration diagram of a vehicle braking device according to a fourth modification.

As shown in FIG. 5, in a vehicle braking device 1D according to Modification 4, the first power supply unit 31 drives the communication passage opening and closing unit 4, and the second power supply unit 32 drives the master fluid passage opening and closing unit 6, based on the configuration in FIG. 3.

The communication passage opening and closing unit 4 is provided between a connection point P1 of the communication passage 73 and the first fluid passage 71 and a connection point P2 of the communication passage 73 and the master fluid passage 74 in the communication passage 73. That is, the communication passage opening and closing unit 4 is disposed on the first wheel cylinder 81 side relative to the connection point P2 in the communication passage 73. The communication passage opening and closing unit 4 is, for example, one or a plurality of normally open electromagnetic valves that can communicate with the communication passage 73 when not energized.

According to this configuration, in a case where the first power supply unit 31 fails, the communication passage opening and closing unit 4 is opened, and the second hydraulic pressure generation unit 22 and the master fluid passage opening and closing unit 6 are driven by the second power supply unit 32. Accordingly, in a state where the master fluid passage 74 is closed, both the wheel cylinders 81 and 82 are pressurized by the second hydraulic pressure generation unit 22.

In a case where the second power supply unit 32 fails, the master fluid passage opening and closing unit 6 is opened, and the first hydraulic pressure generation unit 21 and the communication passage opening and closing unit 4 are driven by the first power supply unit 31. Accordingly, the first hydraulic pressure generation unit 21 pressurizes the first wheel cylinder 81 in a state where the communication passage opening and closing unit 4 is closed, and the brake fluid is supplied from the master cylinder 5 to the second wheel cylinder 82 by the brake operation of a driver. That is, even in a case where the second power supply unit 32 fails, both the wheel cylinders 81 and 82 are pressurized.

In addition, even in a case where both of the power supply units 31 and 32 fail, the master cylinder 5 can supply the brake fluid to both of the wheel cylinders 81 and 82. In this way, according to Modification 4, the same effects as the "common effect" and the "effects generated by the master cylinder" in the present embodiment are also exhibited.

<Modification 5>

Figure 6:
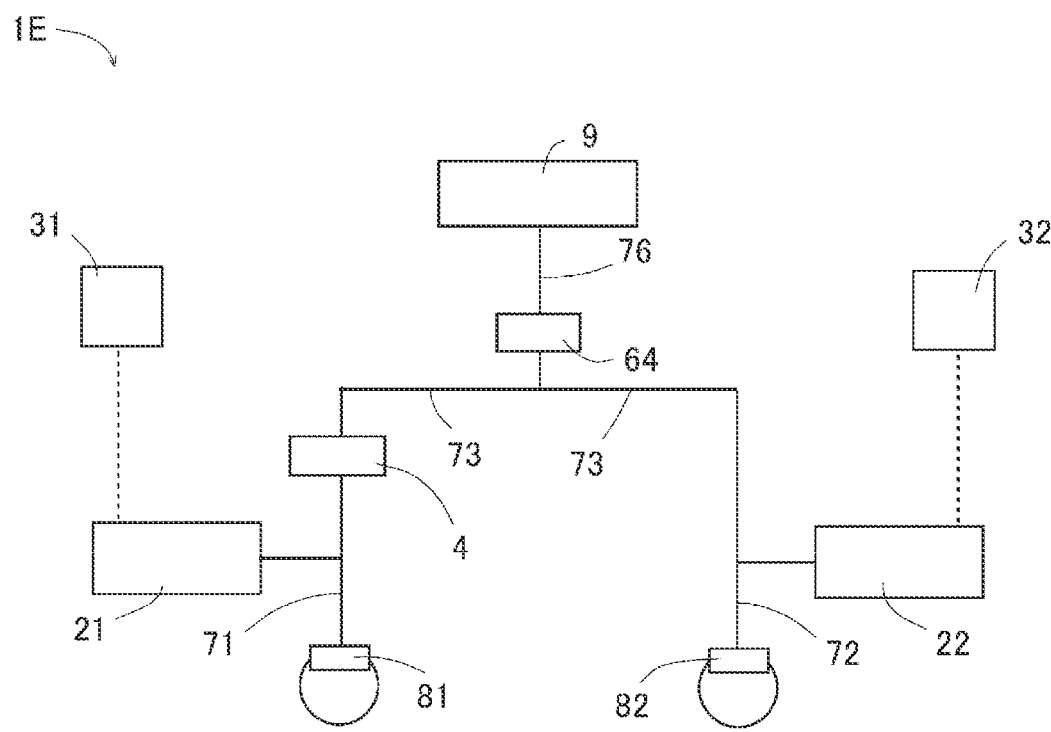
FIG. 6 is a configuration diagram of a vehicle braking device according to a fifth modification.

As shown in FIG. 6, in a vehicle braking device 1E according to Modification 5, a reservoir 9 is disposed instead of the master cylinder 5, and a normally closed reservoir fluid passage opening and closing unit 64 is disposed instead of the normally open master fluid passage opening and closing unit 6, based on the configuration in FIG. 3. That is, the vehicle braking device 1E includes the first hydraulic pressure generation unit 21, the second hydraulic pressure generation unit 22, the first power supply unit 31, the second power supply unit 32, the communication passage opening and closing unit 4, the reservoir 9, and the reservoir fluid passage opening and closing unit 64.

The reservoir 9 is a reservoir tank for storing a brake fluid, and is connected to the communication passage 73 via a reservoir fluid passage 76. The reservoir fluid passage opening and closing unit 64 is a normally closed valve device that is provided in the reservoir fluid passage 76 and opens and closes the reservoir fluid passage 76. The reservoir fluid passage opening and closing unit 64 includes, for example, one or a plurality of normally closed electromagnetic valves that can shut off the reservoir fluid passage 76 when not energized. Power is supplied from the first power supply unit 31, the second power supply unit 32, or another power supply unit to the reservoir fluid passage opening and closing unit 64. The reservoir 9 can replenish the communication passage 73 with the brake fluid.

According to this configuration, even in a case where one of the power supply units fails, the other of the power supply units can drive the corresponding hydraulic pressure generation unit in a state where the reservoir fluid passage opening and closing unit 64 is closed and the communication passage opening and closing unit 4 is opened. Accordingly, according to the configuration of Modification 5, the same effect as the "common effect" in the present embodiment is also exhibited.

<Others>

The present disclosure is not limited to the above-described embodiment and modifications. For example, the hydraulic pressure generation units 21 and 22 are not limited to an electric cylinder, and may be implemented by, for example, a pump, an electromagnetic valve, or the like. For example, in the configuration in FIG. 1, the communication passage opening and closing unit 4 and the master fluid passage opening and closing unit 6 may be driven by a power supply unit other than the first power supply unit 31 and the second power supply unit 32. In the present embodiment and the modifications described above, power from another power supply may be supplied to the simulator cut valve 52. However, as in the configuration in FIG. 1, it is preferable that the power from both the power supply units 31 and 32 is also supplied to the simulator cut valve 52. In addition, Modifications 2 and 5 that do not include the master cylinder 5 are provided, for example, for a wheel cylinder in a rear wheel or for a wheel of a fully autonomous vehicle.

(Common Unit)

Figure 7:
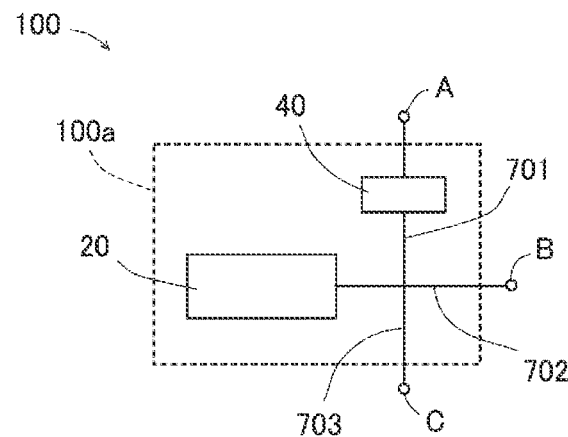
FIG. 7 is a configuration diagram of a common unit.

In addition, as shown in FIG. 7, the configurations in FIGS. 1 to 6 may be implemented by combining a plurality of common units 100 each formed in one housing 100*a* (as one housing). The common unit 100 includes a hydraulic pressure generation unit 20 that generates a hydraulic pressure at a connection destination, fluid passages 701, 702, and 703 which are formed by branching in three directions corresponding to connection portions A, B, and C which are output destinations of the hydraulic pressure generation unit 20, and an electromagnetic valve 40 that opens and closes the fluid passage 701 of the fluid passages 701 to 703 obtained by branching. The fluid passages 701 to 703 obtained by branching in three directions may be connected to fluid passages of other units, or may also be blocked without being connected to other fluid passages.

A case where FIG. 1 is configured using the common unit 100 will be described with reference to FIG. 8. In order to implement the configuration in FIG. 1, two common units 100 are used, and thus, the two common units 100 are defined as a common unit 100A and a common unit 100B below. In addition, a part that cannot be implemented by the common units 100A and 100B is implemented by an optional unit 900. The optional unit 900 is unitized by a housing 900a different from the common units 100A and 100B, and the configuration thereof can be changed according to necessary functions. In this example, the optional unit 900 is used, for which the configuration above the master electromagnetic valve 61 in FIG. 1 (for example, the part excluding the brake pedal 51) is used as one housing.

The connection portion A of the common unit 100A is connected to the connection portion A of the common unit 100B and the master electromagnetic valve 61 of the optional unit 900. The connection portion C of the common unit 100A is connected to the first wheel cylinder 81, and the connection portion B of the common unit 100A is blocked. The connection portion C of the common unit 100B is connected to the second wheel cylinder 82, and the connection portion B of the common unit 100B is blocked. Accordingly, the configuration in FIG. 1 can be implemented using the common units 100.

An advantage of using the common unit 100 is that various system configurations can be flexibly coped with by increasing or decreasing the number of common units 100 or changing the configuration of the optional unit 900 in accordance with necessary performance. For example, in a case where the master cylinder 5 does not need to generate the braking force when a part of the power supply unit fails, the optional unit 900 in FIG. 8 may also be changed to an optional unit 901 shown in FIG. 9, which is implemented by a housing 901a including a reservoir 50 and an electromagnetic valve 60. In addition, cost reduction can also be achieved by producing a large number of housings having the same shape.

Figure 10:
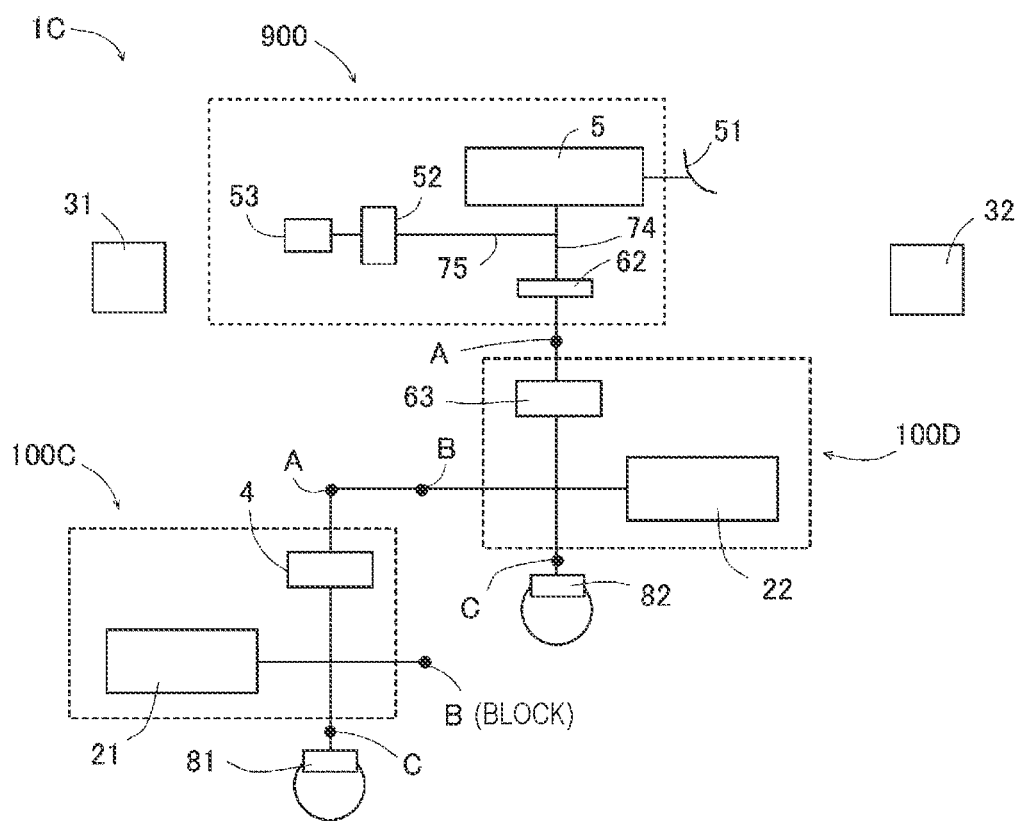
FIG. 10 is a configuration diagram of another example of the vehicle braking device using the common unit.

As an example different from FIG. 8, a case where FIG. 4 is configured using the common units 100 will be described with reference to FIG. 10. The two common units 100 used in FIG. 10 are referred to as a common unit 100C and a common unit 100D, respectively. In addition, a part that cannot be implemented by the common units 100C and 100D is implemented by the optional unit 900. The optional unit 900 used in FIG. 10 is the same as the optional unit 900 used in FIG. 8. The connection portion A of the common unit 100C is connected to the connection portion B of the common unit 100D. The connection portion C of the common unit 100C is connected to the first wheel cylinder 81, and the connection portion B of the common unit 100C is blocked. The connection portion A of the common unit 100D is connected to the first master electromagnetic valve 62 of the optional unit 900. The connection portion C of the common unit 100D is connected to the second wheel cylinder 82. Accordingly, the configuration in FIG. 4 can be implemented by using the common units 100. In the example of FIG. 8, the electromagnetic valves in the common units 100A and 100B are caused to function as communication electromagnetic valves, and in the example of FIG. 10, the electromagnetic valve in the common unit 100D is caused to function as the second master electromagnetic valve 63.

Figure 11:
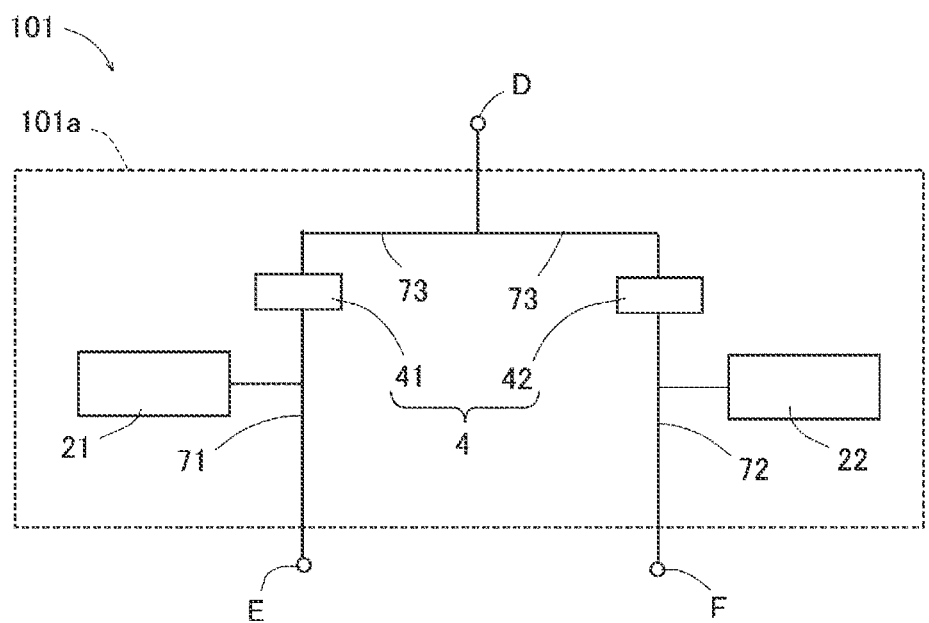
FIG. 11 is a configuration diagram of still another example of the common unit.

The configuration of the common unit 100 is not limited to that shown in FIG. 7. As shown in FIG. 11, the configuration of a common unit 101 may be employed. The common unit 101 is a unit in which a part below the master electromagnetic valve 61 excluding the first wheel cylinder 81 and the second wheel cylinder 82 in FIG. 1 is formed in one housing 101a (as one housing). The common unit 101 includes the first hydraulic pressure generation unit 21, the first communication electromagnetic valve 41, the second hydraulic pressure generation unit 22, and the second communication electromagnetic valve 42. An output of the first hydraulic pressure generation unit 21 branches in two directions, one of which is connected to a connection portion E, and the other of which is connected to a connection portion D and the second communication electromagnetic valve 42 via the first communication electromagnetic valve 41. An output of the second hydraulic pressure generation unit 22 branches in two directions, one of which is connected to a connection portion F, and the other of which is connected to the connection portion D and the first communication electromagnetic valve 41 via the second communication electromagnetic valve 42.

Figure 8:
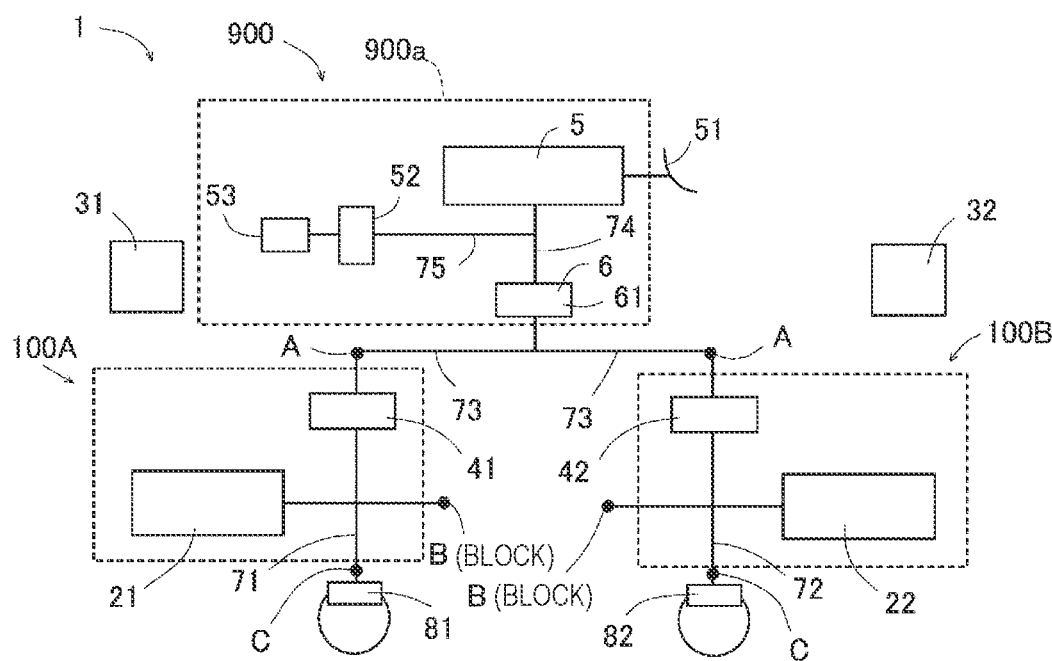
FIG. 8 is a configuration diagram of an example of a vehicle braking device using the common unit.
Figure 9:
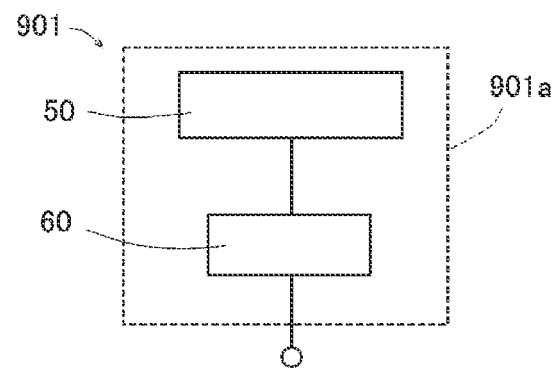
FIG. 9 is a configuration diagram of another example of the common unit.

The connection portion D of the common unit 101 is connected to the master electromagnetic valve 61 of the optional unit 900 common to FIG. 8, the connection portion E is connected to the first wheel cylinder 81, and the connection portion F is connected to the second wheel cylinder 82, so that the configuration in FIG. 1 using the common unit 101 can be implemented. In the case of using the common unit 101, various system configurations can be flexibly coped with by increasing or decreasing the number of common units or changing the configuration of the optional unit according to the necessary performance, as in the case of using the common unit 100.

The configuration using the above-described common unit 100 can be described as follows. That is, the vehicle braking device includes: a first housing that is a single housing including a hydraulic pressure generation unit connected to a wheel cylinder via a first hydraulic passage and generating a hydraulic pressure in the wheel cylinder, and a fluid passage opening and closing unit that is provided in a branched fluid passage, which is a fluid passage branched from the first fluid passage, and opens and closes the branched fluid passage; and a second housing that is a housing having the same configuration as the first housing. The vehicle braking device is implemented by combining the first housing and the second housing.

The invention claimed is:

1. A vehicle braking device, comprising:
a first hydraulic pressure generation unit that is connected to a first wheel cylinder via a first fluid passage and configured to generate a hydraulic pressure in the first wheel cylinder;
a second hydraulic pressure generation unit that is connected to a second wheel cylinder via a second fluid passage and configured to generate a hydraulic pressure in the second wheel cylinder;
a first power supply unit that is configured to supply electric power to the first hydraulic pressure generation unit;
a second power supply unit that is configured to supply electric power to the second hydraulic pressure generation unit; and
a normally open communication passage opening and closing unit that is provided in a communication passage connecting the first fluid passage and the second fluid passage, and configured to open and close the communication passage,
wherein the device is configured to control the hydraulic pressure of the first wheel cylinder by the first hydraulic pressure generation unit and control the hydraulic pressure of the second wheel cylinder by the second hydraulic pressure generation unit so as to independently control the hydraulic pressures in the first and second wheel cylinders while the communication passage opening and closing unit is closed to separate the first fluid passage and the second fluid passage from each other in terms of hydraulic pressure.

2. The vehicle braking device according to claim 1, further comprising:
a master cylinder that is connected to the communication passage via a master fluid passage and configured to generate a hydraulic pressure corresponding to an operation amount of a brake pedal; and
a normally open master fluid passage opening and closing unit that is provided in the master fluid passage and configured to open and close the master fluid passage.

3. The vehicle braking device according to claim 2, wherein
the master fluid passage opening and closing unit includes
a normally open first master electromagnetic valve that is configured to be driven by the first power supply unit, and
a normally open second master electromagnetic valve that is connected in series with the first master electromagnetic valve and configured to be driven by the second power supply unit.

4. The vehicle braking device according to claim 3, wherein
the communication passage opening and closing unit includes a normally open first communication electromagnetic valve and a normally open second communication electromagnetic valve disposed in series with the first communication electromagnetic valve,
the master fluid passage opening and closing unit includes at least one normally open master electromagnetic valve, and
the master fluid passage connects the master cylinder and a part of the communication passage between the first communication electromagnetic valve and the second communication electromagnetic valve.

5. The vehicle braking device according to claim 4, wherein
the first communication electromagnetic valve is driven by the first power supply unit, and
the second communication electromagnetic valve is driven by the second power supply unit.

6. The vehicle braking device according to claim 2, wherein
the master fluid passage opening and closing unit is driven by the first power supply unit and the second power supply unit.

7. The vehicle braking device according to claim 6, wherein
the communication passage opening and closing unit includes a normally open first communication electromagnetic valve and a normally open second communication electromagnetic valve disposed in series with the first communication electromagnetic valve,
the master fluid passage opening and closing unit includes at least one normally open master electromagnetic valve, and
the master fluid passage connects the master cylinder and a part of the communication passage between the first communication electromagnetic valve and the second communication electromagnetic valve.

8. The vehicle braking device according to claim 2, wherein
the communication passage opening and closing unit is provided between a connection point of the communication passage and the first fluid passage and a connection point of the communication passage and the master fluid passage in the communication passage,
the first power supply unit drives the communication passage opening and closing unit, and
the second power supply unit drives the master fluid passage opening and closing unit.

9. The vehicle braking device according to claim 2, wherein
the communication passage opening and closing unit includes a normally open first communication electromagnetic valve and a normally open second communication electromagnetic valve disposed in series with the first communication electromagnetic valve,
the master fluid passage opening and closing unit includes at least one normally open master electromagnetic valve, and
the master fluid passage connects the master cylinder and a part of the communication passage between the first communication electromagnetic valve and the second communication electromagnetic valve.

10. The vehicle braking device according to claim 1, further comprising:
a reservoir that is connected to the communication passage via a reservoir fluid passage and configured to store a brake fluid; and
a normally closed reservoir fluid passage opening and closing unit that is provided in the reservoir fluid passage and configured to open and close the reservoir fluid passage.

* * * * *